US012679133B2

(12) United States Patent
Lemay

(10) Patent No.: US 12,679,133 B2
(45) Date of Patent: Jul. 14, 2026

(54) WEARABLE FINGER-MOISTENING DEVICE FOR EASILY OPENING SUPERMARKET PLASTIC PRODUCE BAGS

(71) Applicant: Diane Lemay, Fitchburg, MA (US)

(72) Inventor: Diane Lemay, Fitchburg, MA (US)

( * ) Notice: Subject to any disclaimer, the term of this patent is extended or adjusted under 35 U.S.C. 154(b) by 457 days.

(21) Appl. No.: 18/215,122

(22) Filed: Jun. 27, 2023

(65) Prior Publication Data

US 2025/0001798 A1     Jan. 2, 2025

(51) Int. Cl.
*B32B 5/18* (2006.01)
*B05C 1/00* (2006.01)
*B43M 11/04* (2006.01)
B32B 27/06 (2006.01)

(52) U.S. Cl.
CPC .............. *B43M 11/04* (2013.01); *B05C 1/00* (2013.01); *B32B 5/18* (2013.01); *B32B 27/065* (2013.01); *Y10T 428/233* (2015.01)

(58) Field of Classification Search
CPC ..... Y10T 428/233; B32B 5/18; B32B 27/065; B05C 1/00
USPC .................................................... 428/71, 125
See application file for complete search history.

(56) References Cited

U.S. PATENT DOCUMENTS

| | | | |
|---|---|---|---|
| 247,033 A | 9/1881 | Fisher | |
| 1,139,942 A | 5/1915 | Wightman et al. | |
| 1,190,905 A | 7/1916 | Jasper et al. | |
| 2,490,650 A | * 12/1949 | Reckler | A01K 97/00 |
| | | | 401/6 |

| | | | |
|---|---|---|---|
| 2,539,029 A | 1/1951 | Megill | |
| 2,621,356 A | 12/1952 | Ingraham | |
| 3,406,658 A | 10/1968 | Neugart | |
| 3,768,916 A | 10/1973 | Avery | |
| 6,481,590 B1 | 11/2002 | Simkins | |
| 6,508,602 B1 | 1/2003 | Gruenbacher et al. | |
| 8,209,776 B1 | 7/2012 | Aragon et al. | |
| 2007/0234950 A1 | 10/2007 | Watts | |
| 2011/0274377 A1 | 11/2011 | Lin | |
| 2011/0306942 A1 | 12/2011 | Thorpe | |

(Continued)

FOREIGN PATENT DOCUMENTS

| | | | |
|---|---|---|---|
| CN | 2219709 Y | 10/1995 | |
| EP | 1358831 A1 * | 11/2003 | ........... A47K 10/421 |

(Continued)

OTHER PUBLICATIONS

English machine translation of JPH0177420 (Year: 1989).*

(Continued)

*Primary Examiner* — Scott W Dodds
(74) *Attorney, Agent, or Firm* — Russ Weinzimmer & Associates, PC; Russ Weinzimmer

(57) ABSTRACT

A wearable finger-moistening device to help open plastic produce bags in the supermarket. At least one opening in a waterproof front panel or a sponge expansion barrier exposes a wettable antimicrobial sponge. The sponge can retain moisture for 4-8 hours. The device is used by touching one's fingers to the moistened sponge, and then using one's moistened fingers to easily open a plastic produce bag. A clasp allows the user to attach the device using only one hand onto a belt loop, a zipper pull, or a purse strap, for example. The at least one opening in the front panel or in a sponge expansion barrier can be shaped to enhance the appearance of the device.

19 Claims, 10 Drawing Sheets

(56) References Cited

U.S. PATENT DOCUMENTS

| | | | |
|---|---|---|---|
| 2014/0215676 A1 | 8/2014 | Jones | |
| 2015/0158042 A1 | 6/2015 | Parker et al. | |
| 2018/0297046 A1 | 10/2018 | Jordan | |
| 2021/0393814 A1 | 12/2021 | Klepfisz et al. | |
| 2022/0047059 A1 | 2/2022 | Romiti | |
| 2023/0012753 A1* | 1/2023 | Klein | A45F 5/00 |

FOREIGN PATENT DOCUMENTS

| | | | |
|---|---|---|---|
| JP | H0177420 | * | 5/1989 |
| JP | 5099496 | | 4/2009 |
| JP | 3164943 | | 12/2010 |
| JP | 2011173402 | | 9/2011 |
| JP | 2011173402 A | * | 9/2011 |
| JP | 2013001113 | | 1/2013 |
| JP | 3228032 | | 10/2020 |
| JP | 3229454 | | 12/2020 |
| JP | 2021016596 | | 2/2021 |
| JP | 3231970 | | 5/2021 |
| JP | 3232739 | | 7/2021 |

OTHER PUBLICATIONS

English machine translation of JP2011173402 (Year: 2011).*

Title: Dental Endo Root Canal Files Stand Holder Wrist Watch Sterilize Sponge Website: https://www.ebay.com/itm/403436593059?_trkparms=amclksrc%3DITM%26aid%3D1110018%26algo%3DHOMESPLICE.COMPLISTINGS%26ao%3D1%26asc%3D243355%26meid%3D46a1169a460746c4b6b4ee2f7ee347b7%26pid%3D101110%26rk%3D5%26rkt%3D12%26sd%3D402753111777%26itm%3D403436593059%26pmt%3D1%26noa%3D0%26pg%3D2563228%26algv%.

Title: Instant Cooling Microfiber Towel Relief Sports Towel Portable Quick Drying Yoga Gym Towel Pilates Running Travel Towel Website: https://www.aliexpress.com/item/1005001994734334.html Date: Downloaded Page on Nov. 19, 2022.

Title: Flower Type Plastic Accounting Supplies / Hand Wetter Sponge Counting Money Paging Count Distribution Tank Website: https://www.aliexpress.com/item/1005002435067255.html Date: Downloaded Page on Nov. 16, 2022 Google Result #3.

Author: 204 Oaks Marketing Inc. Title: See the FrixxnFingers Plastic Bag Opener in action as it opens different types of bags Website: https://www.youtube.com/watch?v=ku7A-qKL_rc Date: Oct. 26, 2022 Youtube Result #1.

* cited by examiner

FIG. 1A                                   FIG. 1B

400
402
404
406
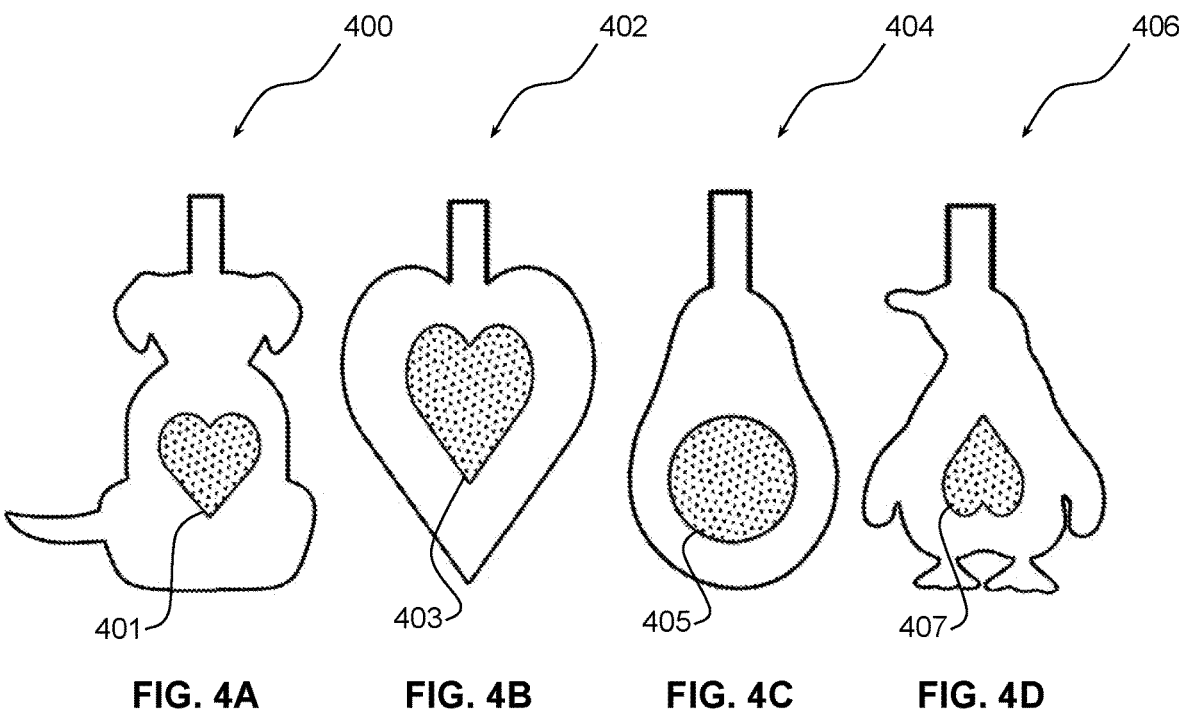
401
403
405
407
FIG. 4A          FIG. 4B          FIG. 4C          FIG. 4D

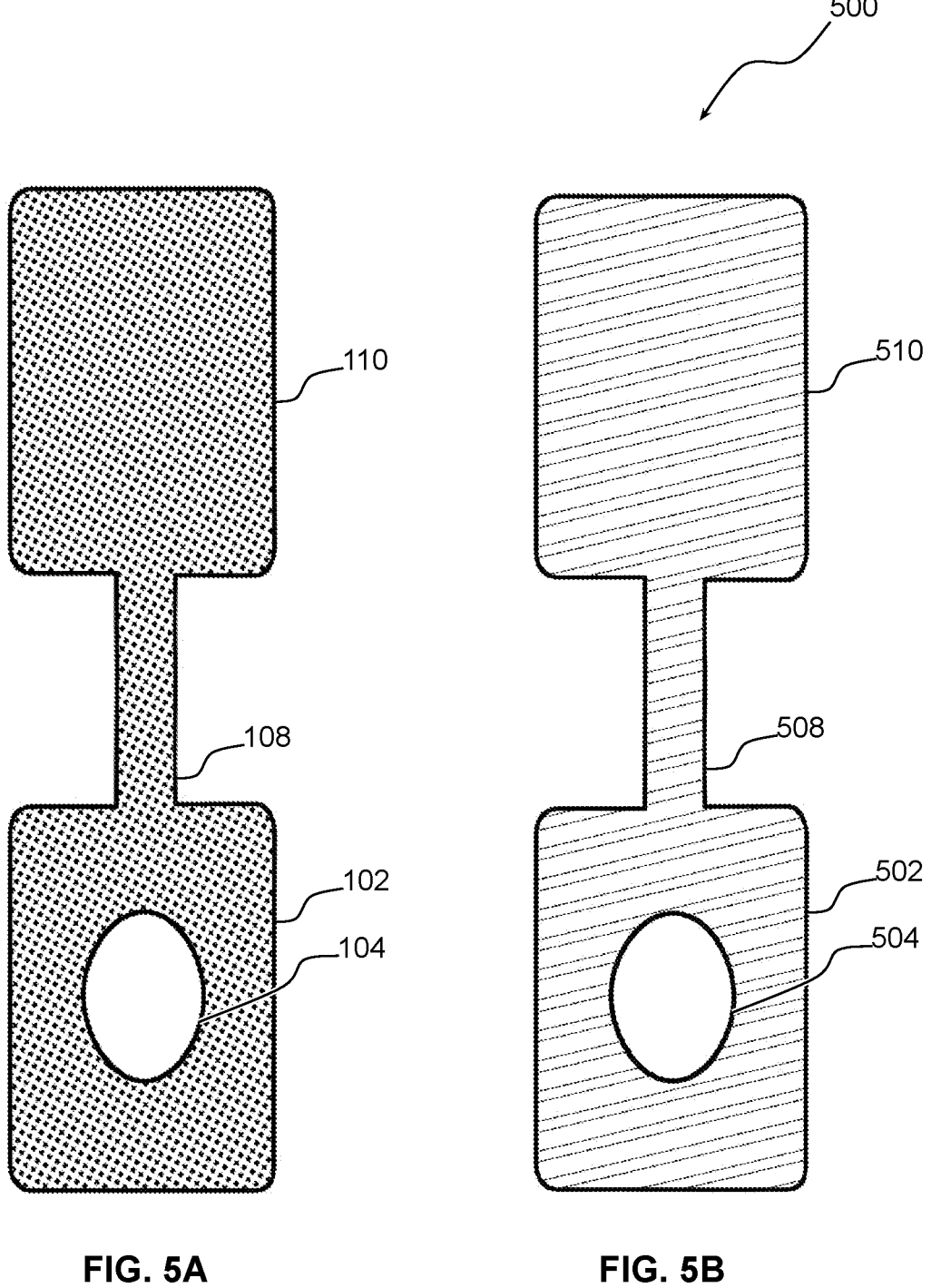
FIG. 5A          FIG. 5B

WEARABLE FINGER-MOISTENING DEVICE FOR EASILY OPENING SUPERMARKET PLASTIC PRODUCE BAGS

FIELD OF THE INVENTION

This invention relates generally to moistening devices, and more particularly to finger moistening devices.

BACKGROUND OF THE INVENTION

Produce in supermarkets is typically placed in a thin plastic produce bag before being taken to the cash register. The thin plastic produce bags are made from High-density polyethylene (HDPE), 0.44 mil thick. Such thin plastic bags are very difficult to open, often requiring that the shopper stop to use both hands to open the bag so that the shopper can place fresh produce, such as fresh-grown peppers, eggplants, avocados, and cilantro into the bag.

Some people have learned that wetting one's fingers can make the process of separating the plastic layers of the bag easier, since the wetness of the fingers increases the frictional forces of the fingers upon the plastic of the bag.

However, there are no good sources of water available in a supermarket for the purpose of moistening one's fingers. A possible source are the fresh vegetables themselves, which are often sprayed with water to keep them fresh. One could touch a recently misted vegetable to moisten one's fingers, but that would tend to contaminate the otherwise clean vegetables with many fingers, some of which could be harboring harmful bacteria, such as *E. coli* or MRSA.

Alternatively, one could carry a moistened sponge in one's pocket or purse to the supermarket. However, this would be inconvenient, awkward, and likely would transfer the moisture to the inside of the pocket or purse and/or dry out before the sponge could be used in the supermarket.

SUMMARY OF THE INVENTION

The invention is a wearable finger-moistening device to help open plastic produce bags in the supermarket with ease.

The opening in the front panel exposes an antimicrobial sponge that allows water to be absorbed. The front and back panels can be made from various waterproof materials.

The clasp allows the user to attach the device onto clothing using only one hand, such as onto a belt loop, also allowing it to be easily hung from a keyring, a zipper pull, or a purse strap, for example.

The user only needs to run the exposed sponge portion under water for a second or two to be fully moistened. The sponge retains moisture for 4-8 hours, and can be remoistened anywhere, such as from a faucet, or from a water bottle.

The device is used by touching one's fingers to the moistened sponge to moisten the fingers, and then using one's moistened fingers to easily open a plastic produce bag.

The device may also be used to more easily separate fresh bills, pages of a book, and other thin materials that can be difficult to separate.

A general aspect of the invention is a wearable finger-moistening device, the device including: a sponge having a sponge outer boundary; a front panel and a back panel, the front panel having an outer boundary and the back panel having an outer boundary, the front panel being in connected relationship with the back panel via a tab having a fold line that represents a transition from the front panel to the back panel, and the outer boundary of the front panel being in bilaterally symmetric relationship about the fold line with the outer boundary of the back panel, the front panel having at least one opening with an opening shape and size that can be inscribed within the sponge outer boundary, the front panel having a peripheral region in bonded relationship with a peripheral region of the back panel so as to trap the sponge between the front panel and the back panel, the sponge being finger accessible via the opening in the front panel, and an open channel formed along the fold line of the tab when the peripheral region of the front panel enters bonded relationship with the peripheral region of the back panel, the open channel configured to receive an attachment assembly.

In some embodiments, the wearable finger-moistening device further includes: an attachment assembly.

In some embodiments, the attachment assembly includes one of: a clasp, a carabiner, a one-handed connection device, a key ring, a paper clip, a ring having a closable opening.

In some embodiments, the opening in the front panel is one of: a heart-shaped hole, a round hole, an oval hole, a square hole, a rectangular hole, a diamond-shaped hole.

In some embodiments, the sponge is trapped between the front panel and the back panel such that all of the at least one opening presents the sponge for finger access.

In some embodiments, the front panel and the back panel include a layer of waterproof or water-resistant material.

In some embodiments, the sponge is configured to retain moisture for 4-8 hours.

Another general aspect of the invention is a wearable finger-moistening device, this device including: a front panel having at least one opening; a sponge configured to retain moisture; a back panel in sealed relationship with the front panel, such that the sponge is captured between the front panel and the back panel, a portion of the sponge being exposed through the at least one opening; and a tab connected to at least one of the front panel and the back panel, the tab configured for attachment via an attachment assembly to a wearable object.

In some embodiments, the tab is a strip of material that is an extension of the front panel that extends to join the back panel.

In some embodiments, the tab is folded in half along a fold line.

In some embodiments, the sponge is wider and longer than the at least one opening such that all areas of the at least one opening expose a portion of the sponge.

In some embodiments, the front panel is in peripherally bonded relationship with the back panel so as to trap the sponge between the front panel and the back panel, the sponge being finger-accessible via the at least one opening.

In some embodiments, the tab configured for attachment to the attachment assembly is folded to form an open channel configured to capture the attachment assembly.

In some embodiments, the sponge is treated to be antimicrobial.

In some embodiments, the front panel and the back panel include a layer of waterproof or water-resistant material.

Yet another general aspect of the invention is a wearable finger-moistening device, this device including: a front panel connected to a back panel via a tab, the front panel having at least one opening; a first double-sided adhesive layer sized and shaped to match the front panel, the back panel, and the tab; a foam wall with a foam tab, the foam wall and the foam tab sized and shaped to match the back panel and the tab, the foam wall defining a foam wall opening configured to receive a sponge; and a sponge that is sized and shaped to fit within the foam wall opening.

In some embodiments, the wearable finger-moistening device includes: a sponge expansion barrier; and a second double-sided adhesive layer shaped like the sponge expansion barrier.

In some embodiments, the wearable finger-moistening device includes: an attachment assembly configured to be captured along the foam tab when the foam tab, a respective portion of the first double-sided adhesive layer, and the tab are folded over.

In some embodiments, the attachment assembly includes one of: a clasp, a carabiner, a one-handed connection device, a key ring, a paper clip, a ring having a closable opening.

In some embodiments, the sponge is treated to be anti-microbial.

BRIEF DESCRIPTION OF THE DRAWINGS

Many additional features and advantages will become apparent to those skilled in the art upon reading the following description, when considered in conjunction with the accompanying drawings, wherein:

FIGS. 4A, 4B, 4C, and 4D are top views showing a plurality of embodiments of the front and back panels of the wearable finger-moistening device, each FIG showing a different shape of an outer boundary of the front panel, each FIG also showing a different shape or size of opening for providing finger access to a sponge.

FIG. 5A is a top view of the front and back panel of the embodiment of FIGS. 1A and 1B, without a sponge.

FIG. 5B is a first double-sided adhesive layer cut to match the size and shape of the front and back panel of FIG. 5A.

DETAILED DESCRIPTION

Figure 1:
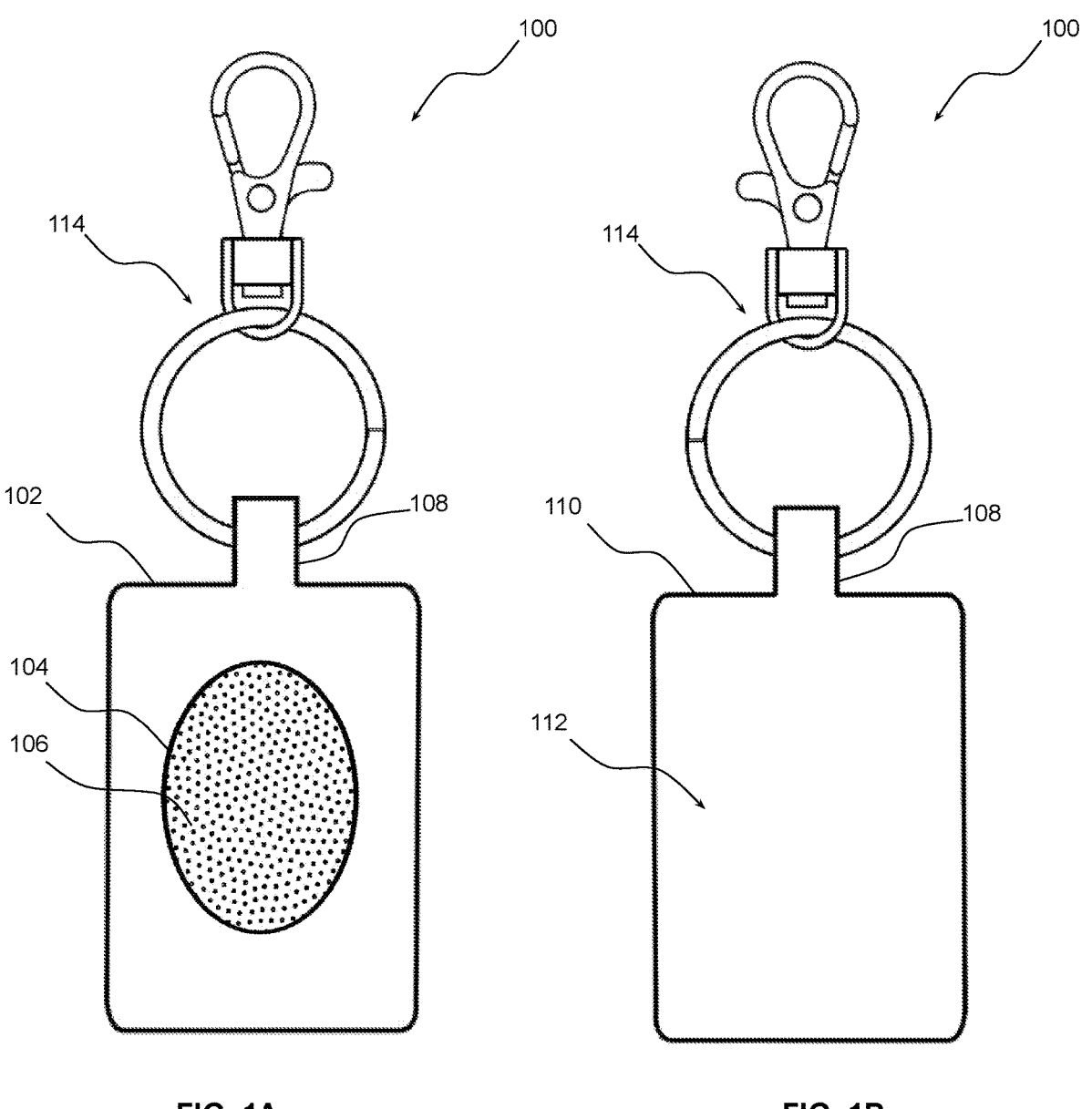
FIG. 1A is a front view of an embodiment of the wearable finger-moistening device, showing a front panel with an opening for a sponge, and showing a folded tab that extends from the front panel to a back panel, the front panel being adhesively attached to the back panel, so as to capture an attachment assembly for attaching the device to clothing worn by a person, or to an accessory worn by the person.
FIG. 1B is a rear view of the embodiment of FIG. 1A, showing the rear panel with an area for advertising or company info, and showing the folded tab that extends from the front panel to the back panel so as to capture the attachment assembly for attaching to the clothing or to the accessory worn by the person.

Referring to FIG. 1A, an embodiment 100 of the wearable finger-moistening device of the invention includes: a front panel 102, an opening 104 in the front panel 102, and a wettable sponge 106 accessible through the opening 104. A folded tab 108 extends from the front panel 102 to the back panel 110 so as to capture an attachment section 114.

Referring to FIG. 1B, the rear of the embodiment 100 of FIG. 1A includes a back panel 110 that is secured about its periphery to the front panel, thereby capturing the sponge 106 between the front panel 102 and the back panel 110. Also, the back panel 110 has an area 112 suitable for presenting advertising and/or business information, such as business logo, business name, address, website, and/or phone number. This advertising and/or business information will be visible to other shoppers whenever the device 100 is used in a supermarket.

Figure 2:
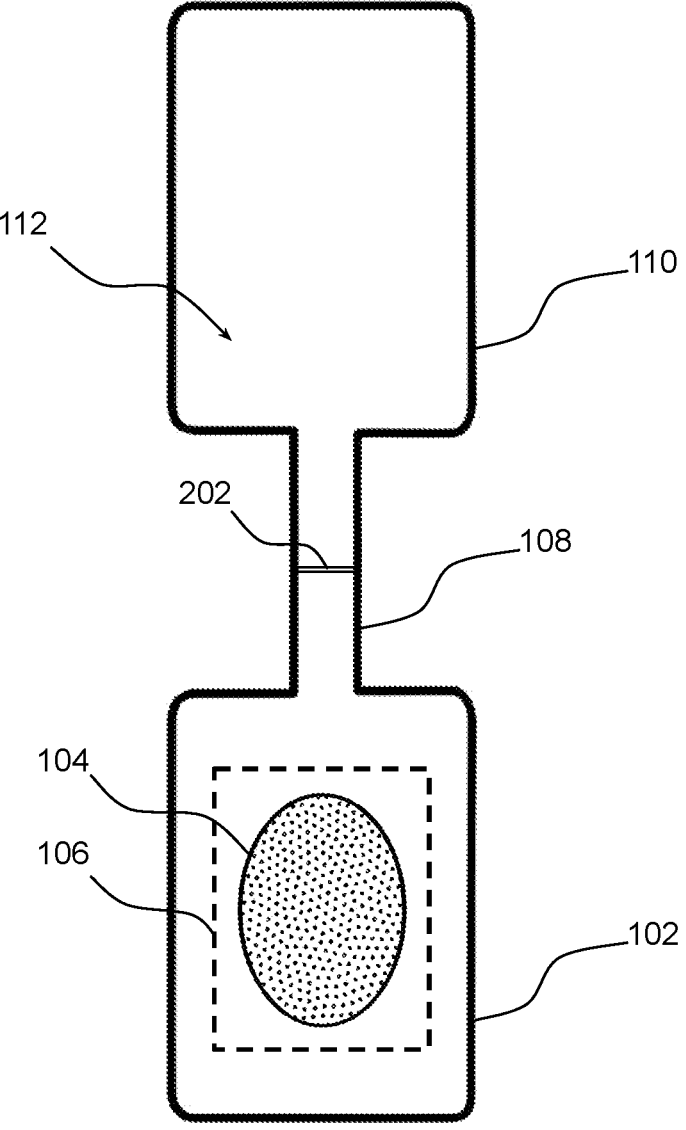
FIG. 2 is a top view of the front and back panel of the embodiment of FIGS. 1A and 1B, showing the front panel with an opening exposing a portion of a sponge, the front panel connected via the tab in an unfolded condition to the back panel, also showing how the outer boundary of the front panel is a mirror image (across a fold line) of the outer boundary of the back panel.

With reference to FIG. 2, the embodiment 100 of FIGS. 1A and 1B is shown unfolded, the front panel 102 being connected to the back panel 110 via the tab 108 shown here in an unfolded condition. A fold line 202 is shown that bisects the tab 108, the tab 108 being folded in half along the fold line 202 when the front panel 102 is secured to the back panel 110 so as to trap a rectangular embodiment 106 of the sponge therebetween, the sponge 106 being accessible to a user's finger through the oval embodiment 104 of the opening.

Thus, the front panel 102 is shown with an oval opening 104 through which an exposed portion of the rectangular sponge 106 is visible. The portions of the rectangular sponge 106 not visible through the oval opening 104 are shown in dashed outline behind the front panel 102.

The front panel 102 and back panel 110 can be made from rigid materials such as plastic or metal, semi-rigid materials such as composites or silicone, or from more flexible materials such as leather, faux leather, or flexible plastics. The tab 108 can be made of the same material as the front panel 102 and back panel 108, or it can be made from a different material, such as linen or plastic.

Figures 3A, 3B, 3C:
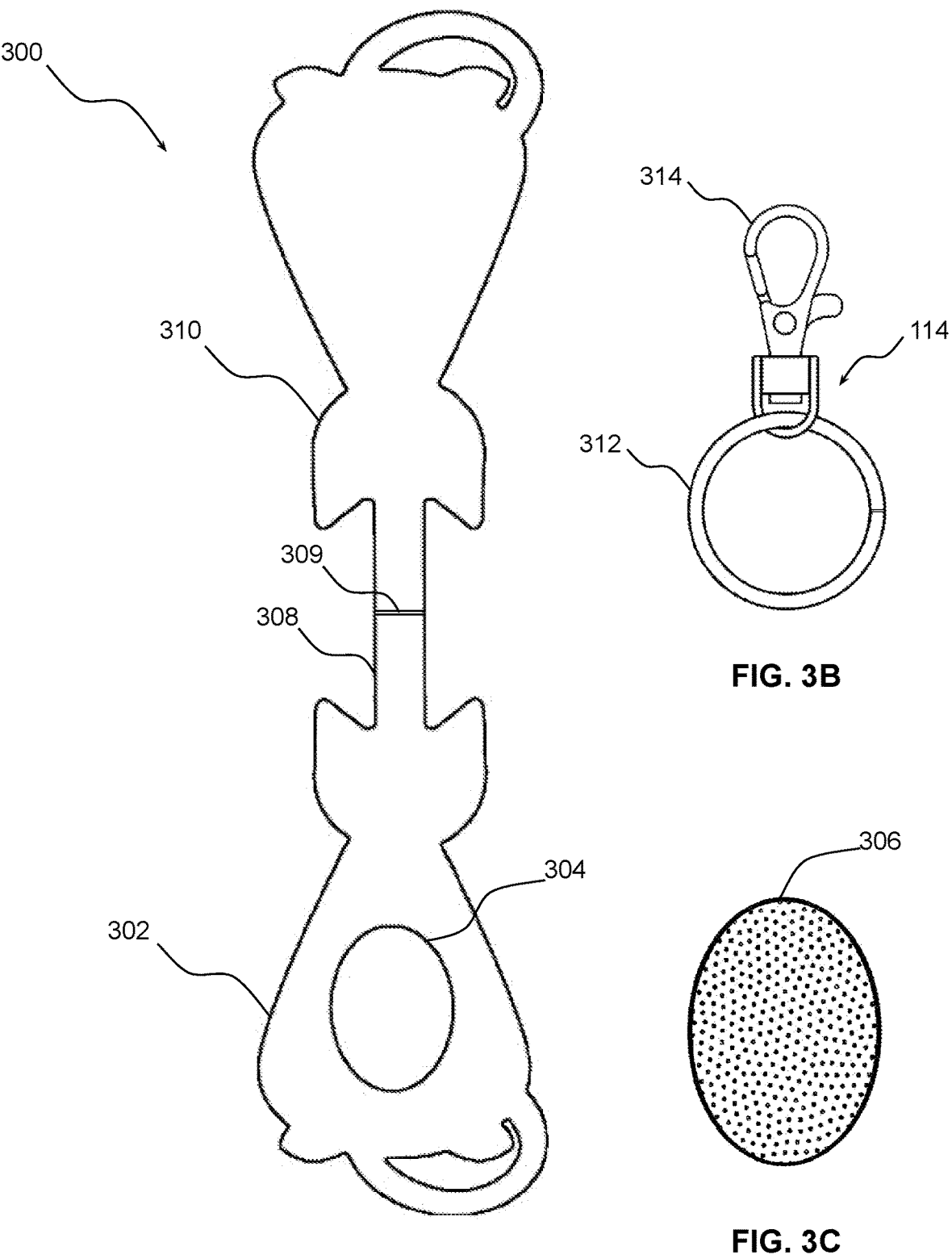
FIG. 3A is a top view of a second embodiment having a cat silhouette front panel with an oval opening for exposing a sponge, also showing the front panel connected via a foldable tab to the cat silhouette back panel without an opening, also showing how the outer boundary of the cat silhouette front panel is a mirror image (across the fold line) of the outer boundary of the cat silhouette back panel.
FIG. 3B is a top view of an embodiment of an attachment assembly, such as a clasp and keyring, for attaching the device to clothing worn by a person, or to an accessory worn by the person.
FIG. 3C is a top view of a sponge to be captured between the cat silhouette front panel and the cat silhouette back panel of FIG. 4A, the sponge being of a substantially similar shape and of a slightly larger size than the opening in the cat silhouette front panel of FIG. 3A.

With reference to FIG. 3A, another embodiment 300 having the same function as the embodiment shown in FIG. 2, but having a front panel 302 and back panel 310 shaped like a silhouette of a cat.

Referring to FIG. 3B, an embodiment of the attachment section 114 includes a swivel clip hook 314 and a key ring 312. Any mechanism that can engage with the tab 108 that facilitates attachment to a belt loop, hand bag strap, zipper pull, or other portion of a person's clothing could be used in place of the swivel clip hook 314 and key ring 312, such as: a plastic gate carabiner, a metal screw carabiner, a fabric tie, or a wooden keyring.

FIG. 3C shows a sponge 306 that is the same shape as the window 304, but is scaled to be larger so as to be captured when the front panel 302 is secured to the back panel 310 by being brought together by folding the tab 308 along the fold line 309. Since the sponge 306 is larger than the window 304, the sponge 306 can be glued to the periphery of the circle 304.

The sponge 306 can be made from a variety of synthetic materials, such as: polyester, polyurethane, vegetable cellulose, or any other material that can retain moisture so as to enable moistening of a fingertip by contact of the fingertip with the sponge 306. The sponge 306 can also be infused with an antimicrobial agent. The sponge can be of a thickness to contain enough water to be retained by the sponge for 4 to 8 hours, e.g., 0.04 inch, or any thickness within the range of 0.03 inch to 0.08 inch.

Referring to FIGS. 4A, 4B, 4C, and 4D, a variety of embodiments (400, 402, 404, and 406, respectively) having the same function as the embodiment shown in FIGS. 2 and 3A serve to illustrate many other possible shapes of front and back panels, as well as a variety of shapes and sizes of windows through which to access a moistened sponge.

The possibility of different silhouette shapes and sizes further expands the appeal of the device, and also provides promotional value as facilitated by advertising on the back panel.

With reference to FIG. 5A, the front 102 and back panel 110 of the embodiment 100 of FIGS. 1A and 1B are shown unfolded without a sponge 106 and without an attachment section 114. For example, the front panel 102, back panel 110, and tab 108 can be made of faux-leather.

Referring to FIG. 5B, a first double-sided adhesive layer 500 is shown that is cut to provide front adhesive panel 502 and back adhesive panel 510 to match the size and shape of the front 102 and back 110 panels, respectively, as well as the tab 108 of FIG. 5A. In some embodiments, as a first construction step, the first double-sided adhesive layer 500 is to be aligned with and then pressed against the front 102 and back 110 panels, as well as the tab 108. For example, Crown™ #513 Double-Sided Adhesive Tape can be used. Crown™ #513 High Performance Ultra-Thin Double-Sided Adhesive Tape (20 mm×50 m) has a width of 20 mm, and a thickness of 0.17 mm. This double-sided tape has a high-performance acrylic adhesive that provides a high level of adhesive peel and shear performance. The excellent initial tack ensures that a bond of good integrity is achieved soon after application. This double-sided tape is suitable for use with a wide range of materials, including stainless steel, felt, foam, rubber, and polycarbonates.

Alternatively, one could use Crown™ #513g, with a Peeling Force of >16 N/24 mm, with a thickness 0.16 microns.

Figures 6A, 6B:
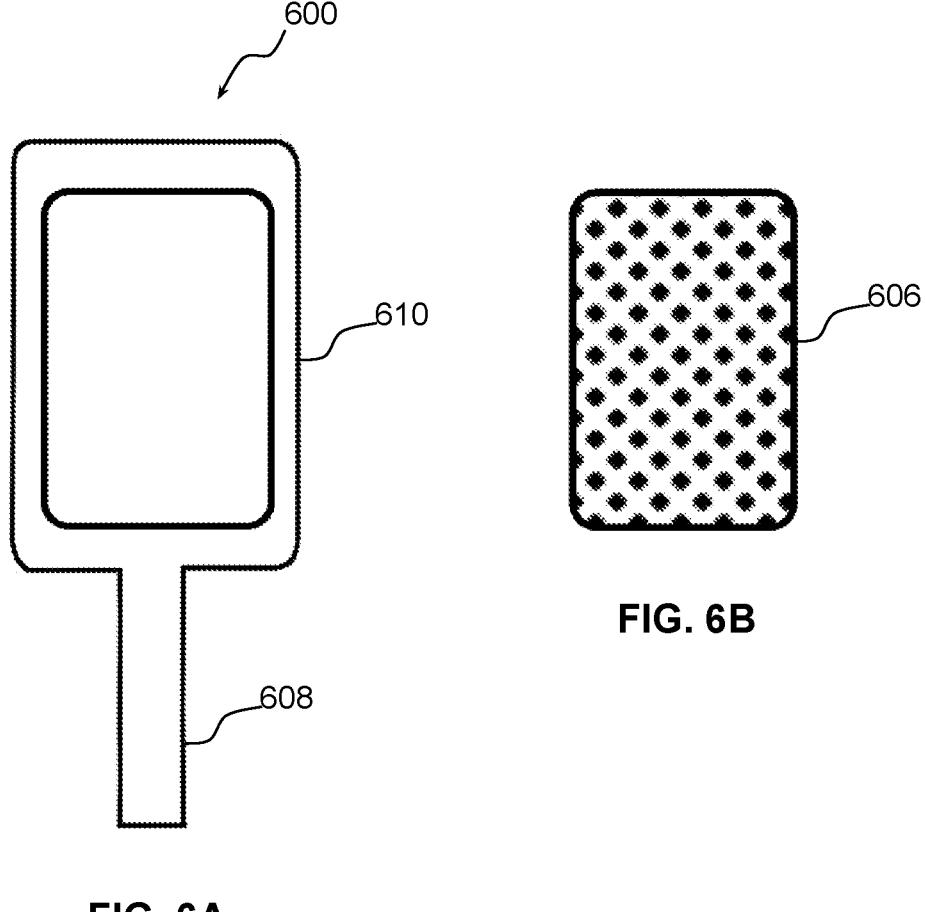
FIG. 6A is a top view of a foam wall for structural support and for constraining lateral expansion of a sponge surrounded by the foam wall.
FIG. 6B is a top view of a sponge sized to fit within the foam wall.

With reference to FIG. 6A, a foam wall 600 is shown that provides structural support, and serves to constrain lateral expansion of a sponge 606 of FIG. 6B placed so as to be surrounded by the foam wall 600. For example, a suitable material to make the foam wall 600 is EVA (Ethylene-Vinyl Acetate), which is a copolymer of ethylene and vinyl acetate (also known as poly ethylene-vinyl acetate, i.e., PEVA). The foam wall 600 can be 1.6 mm thick, for example.

The foam wall 600 includes a constraining wall portion 610 and a tab portion 608. In some embodiments, as a second construction step, the constraining wall portion 610 and the tab portion 608 are respectively aligned with the back portion 510 and the tab portion 508 of the double-sided adhesive layer 500, and then the entire foam wall 600 is pressed against the double-sided adhesive layer 500. In some embodiments, as a third construction step, the sponge 606 is inserted into the constraining wall portion 610 and then pressed against the back portion 510 of the double-sided adhesive layer 500.

Figure 7:
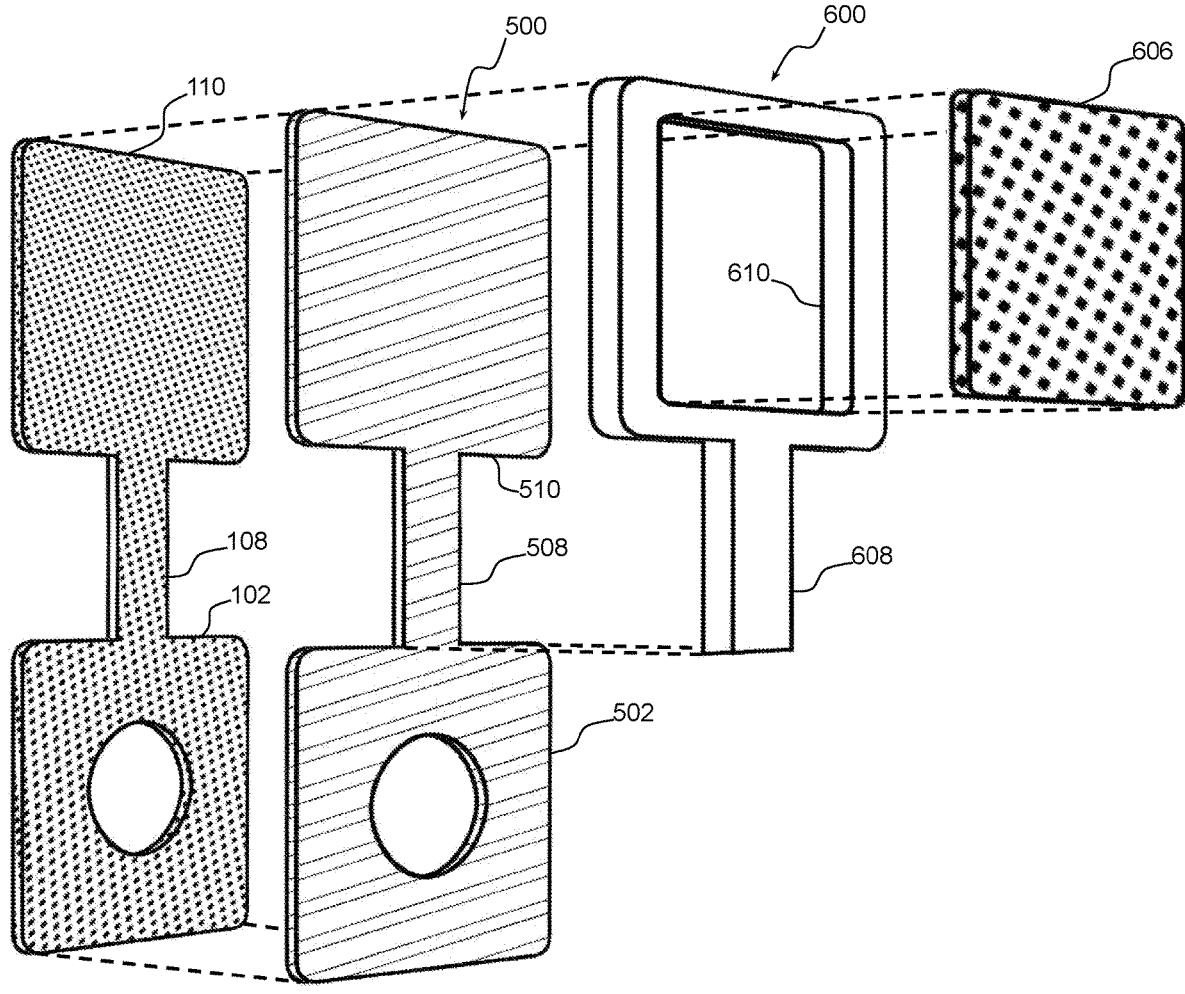
FIG. 7 is an exploded view of an embodiment, showing the front and back panel joined by a tab, the double-sided adhesive layer of the same size and shape, the foam wall, and the sponge.

Referring to FIG. 7, a construction sequence is shown whereby the front 102 and back 110 panels joined by a tab 108 receive the double-sided adhesive layer 500. Then, the tab portion 508 of the double-sided adhesive layer 500 receives the tab portion 608 of the foam wall 600. Next, the sponge 606 is inserted into the wall portion 610 of the foam wall 600 such that the sponge 606 adheres to the back portion 510 of the double-sided adhesive layer 500.

Then, the three tabs 108, 508, and 608, which are adhesively joined, are together folded in half (such as along the fold line 202 shown in FIG. 2) such that the front panel 102 along with the adhering front adhesive panel 502 make adhesive contact with constraining wall portion 610 and the sponge 606, thereby providing a device similar to the device shown in FIGS. 1A and 1B, but further including a double-sided adhesive layer 500 and a foam wall 600.

Figure 8:
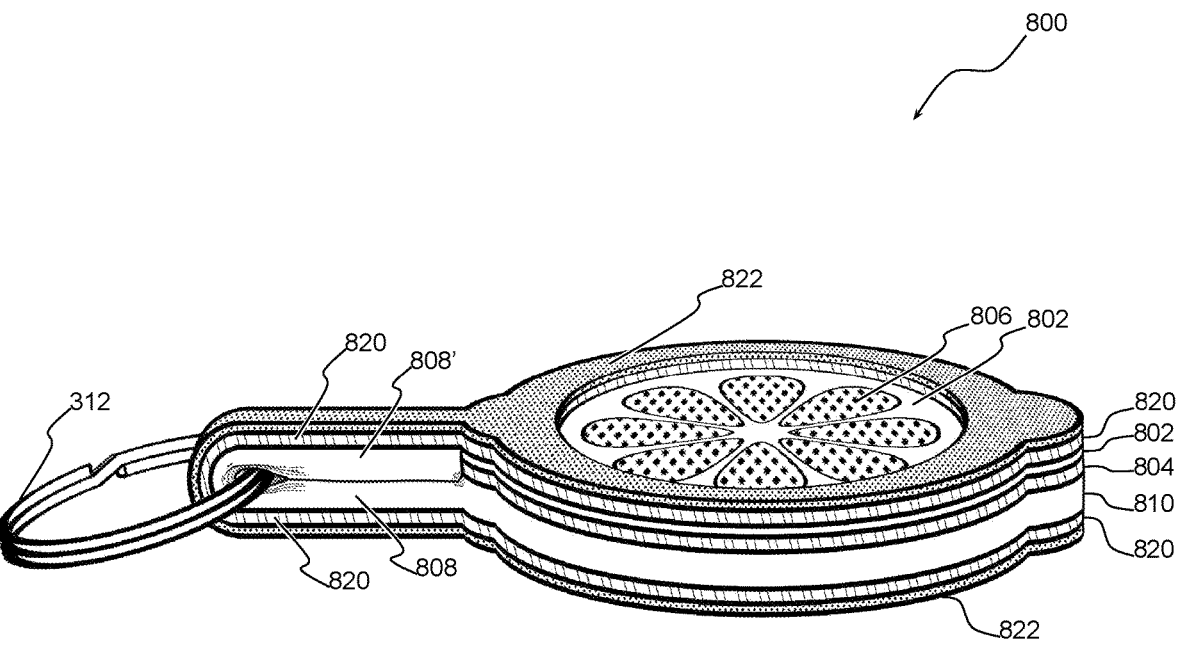
FIG. 8 is an orthographic view of another embodiment of the wearable finger-moistening device, having a main body shaped like a profile of a lemon or lime, the main body including a sponge expansion barrier and a second double-sided adhesive layer shaped like the sponge expansion barrier.

With reference to FIG. 8, is another embodiment 800 of the wearable finger-moistening device is shown, this embodiment 800 having a main body shaped like a profile of a lemon or lime, the main body including a sponge expansion barrier 802 that helps to retain the sponge 806, as well as restrains expansion of the sponge 806 when moistened with water, and a second double-sided adhesive layer 804 shaped like the sponge expansion barrier 802, that adheres to the sponge expansion barrier 802.

This embodiment 800 also includes a foam wall 800 having a wall portion 810 that provides structural support, and serves to constrain lateral expansion of a sponge 806 placed so as to be surrounded by the wall portion 810. The tab portion 808, 808' of the foam wall 800 folds over to capture a keyring 312.

Also, the sponge 806, which is surrounded by the wall portion 810 of the foam wall 800, also adheres to the back portion of the double-sided adhesive layer 820. The double-sided adhesive layer 820 also extends along the bottom 808' of the tab portion 808 and along the top 808' of the tab portion 808 of the foam wall 810.

A faux leather layer 822 adheres to the entire double-sided adhesive layer 820, thereby forming the outer surface of the embodiment 800 of the wearable finger-moistening device.

Figure 9:
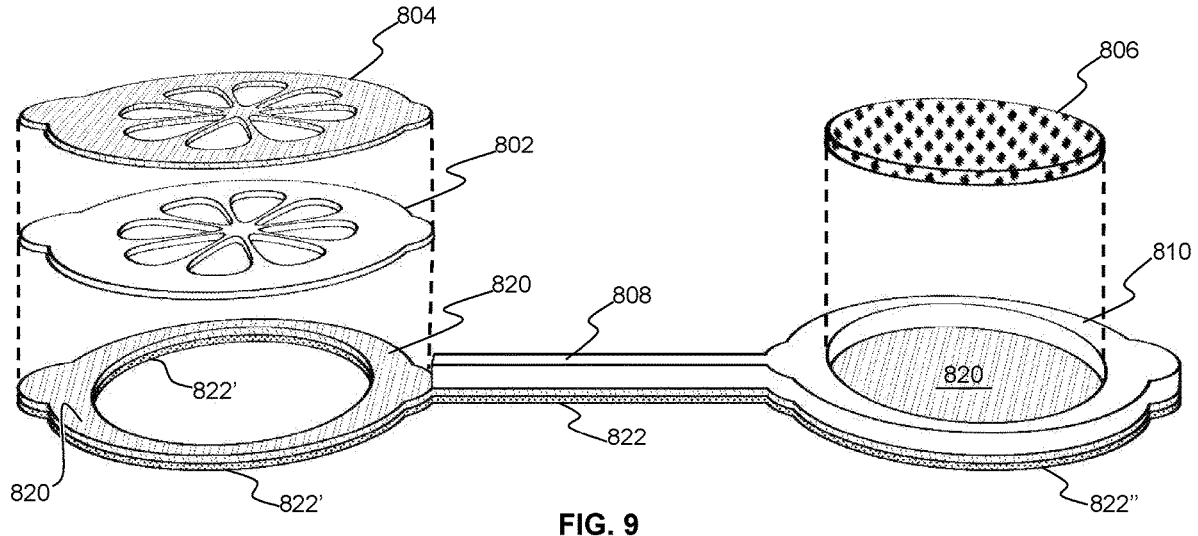
FIG. 9 is an exploded view of the components of the embodiment of FIG. 8, before being folded to provide the embodiment of FIG. 8, showing the front and back panel connected by a tab, a first double-sided adhesive layer shaped like the front and back panel connected by the tab, a foam wall defining a foam wall opening and a foam tab, a sponge sized and shaped to fit within the foam wall opening, a sponge expansion barrier, and a second double-sided adhesive layer shaped like the sponge expansion barrier.

Referring to FIG. 9, to help understand the layers of the embodiment 800 shown in FIG. 8, an exploded unfolded view of the components is provided. Here it can more easily be seen that the faux leather layer 822 forms the front 822' and back 822" panels, which are connected by a tab 822. A first double-sided adhesive layer 820 adheres to and is shaped like the front 822' panel, the back 822" panel, and the connecting tab 822. The foam wall 800 defines a foam wall opening 810 that adheres to the front 822' panel, and a foam tab 808 that adheres to the connecting tab 822.

A sponge 806 is sized and shaped to fit within the foam wall opening 810, and adheres to the first double-sided adhesive layer 820.

A sponge expansion barrier 802 also adheres to the first double-sided adhesive layer 820, and a second double-sided adhesive layer 804 (shaped like the sponge expansion barrier 802) adheres to the expansion barrier 802, as well as adhering to the the foam wall opening 810 and the top of the sponge 806 when the faux leather layer 822 is folded over about a midpoint of the foam tab 808.

Figure 10:
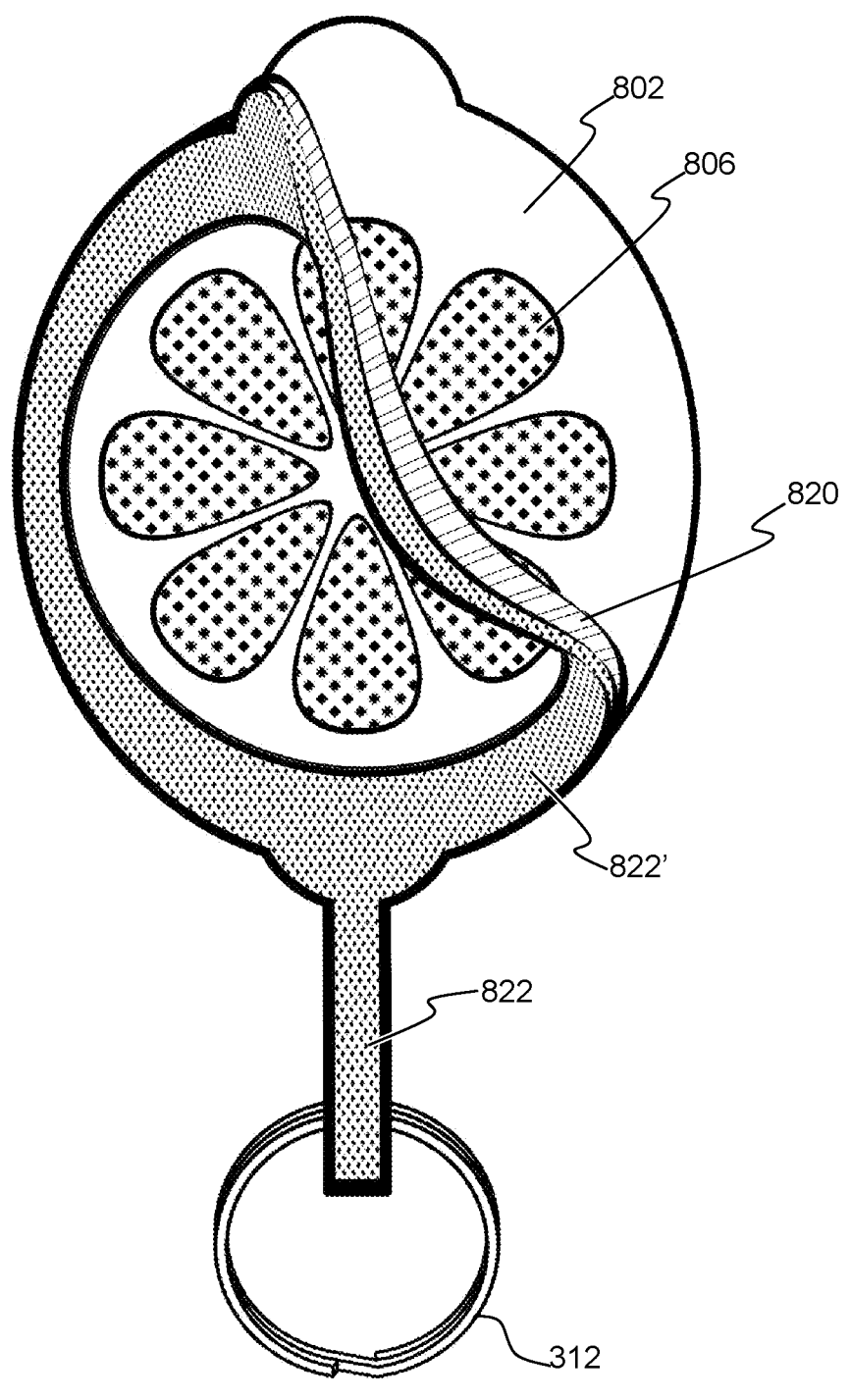
FIG. 10 is a top view of the embodiment of FIG. 8, showing the front panel and the first double-sided adhesive layer adhered to the front panel, just before the first double-sided adhesive layer is pressed onto the rest of the periphery of the sponge expansion barrier.

With reference to FIG. 10, the front panel 822' and the first double-sided adhesive layer 820 are shown adhered to all of the faux leather front panel 822', and to a portion of the periphery of the sponge expansion barrier 802. Also visible through a plurality of holes in the sponge expansion barrier 802 is the sponge 806. A keyring 312 is shown captured by the folded tab portion 822 connecting the front panel 822' and the back panel 822".

Other modifications and implementations will occur to those skilled in the art without departing from the spirit and the scope of the invention as claimed. Accordingly, the above description is not intended to limit the invention, except as indicated in the following claims.

What is claimed is:

1. A wearable finger-moistening device, the device comprising:
    a sponge having a sponge outer boundary;
    a front panel and a back panel,
        the front panel having an outer boundary and the back panel having an outer boundary,
        the front panel being in connected relationship with the back panel via a tab having a fold line that represents a transition from the front panel to the back panel, and the outer boundary of the front panel being in bilaterally symmetric relationship about the fold line with the outer boundary of the back panel,
        the front panel having at least one opening with an opening shape and size that can be inscribed within the sponge outer boundary,
        the front panel having a peripheral region in bonded relationship with a peripheral region of the back panel so as to trap the sponge between the front panel and the back panel, the sponge being finger accessible via the opening in the front panel, and
        an open channel formed along the fold line of the tab when the peripheral region of the front panel enters bonded relationship with the peripheral region of the back panel, the open channel configured to receive an attachment assembly.

2. The device of claim 1, further including:
    an attachment assembly.

3. The device of claim 2, wherein the attachment assembly includes one of:
    a clasp, a carabiner, a one-handed connection device, a key ring, a paper clip, a ring having a closable opening.

4. The device of claim 1, wherein the opening in the front panel is one of:
    a heart-shaped hole, a round hole, an oval hole, a square hole, a rectangular hole, a diamond-shaped hole.

5. The device of claim 1, wherein the sponge is trapped between the front panel and the back panel such that all of the at least one opening presents the sponge for finger access.

6. The device of claim 1, wherein the front panel and the back panel include a layer of waterproof or water-resistant material.

7. The device of claim 1, wherein the sponge is configured to retain moisture for 4-8 hours.

8. A wearable finger-moistening device, the device comprising:
    a front panel having at least one opening;
    a sponge configured to retain moisture;
    a back panel in sealed relationship with the front panel, such that the sponge is captured between the front panel and the back panel, a portion of the sponge being exposed through the at least one opening; and
    a tab connected to at least one of the front panel and the back panel, the tab configured for attachment via an attachment assembly to a wearable object, and
    the tab configured for attachment to the attachment assembly is folded to form an open channel configured to capture the attachment assembly.

9. The wearable finger-moistening device of claim 8, wherein the tab is a strip of material that is an extension of the front panel that extends to join the back panel.

10. The wearable finger-moistening device of claim 8, wherein the tab is folded in half along a fold line.

11. The wearable finger-moistening device of claim 8, wherein the sponge is wider and longer than the at least one opening such that all areas of the at least one opening expose a portion of the sponge.

12. The wearable finger-moistening device of claim 8, wherein the front panel is in peripherally bonded relationship with the back panel so as to trap the sponge between the front panel and the back panel, the sponge being finger-accessible via the at least one opening.

13. The wearable finger-moistening device of claim 8, wherein the sponge is treated to be anti-microbial.

14. The wearable finger-moistening device of claim 8, wherein the front panel and the back panel include a layer of waterproof or water-resistant material.

15. A kit for forming a wearable finger-moistening device, the kit comprising:
    a front panel connected to a back panel via a tab, the front panel having at least one opening;
    a first double-sided adhesive layer sized and shaped to match the front panel, the back panel, and the tab;
    a foam wall with a foam tab, the foam wall and the foam tab sized and shaped to match the back panel and the tab, the foam wall defining a foam wall opening configured to receive a sponge; and
    a sponge that is sized and shaped to fit within the foam wall opening.

16. The kit of claim 15, further including:
    a sponge expansion barrier; and
    a second double-sided adhesive layer shaped like the sponge expansion barrier.

17. The kit of claim 15, further including:
    an attachment assembly configured to be captured along the foam tab when the foam tab, a respective portion of the first double-sided adhesive layer, and the tab are folded over.

18. The kit of claim 17, wherein the attachment assembly includes one of:
    a clasp, a carabiner, a one-handed connection device, a key ring, a paper clip, a ring having a closable opening.

19. The kit of claim 15, wherein the sponge is treated to be anti-microbial.

\* \* \* \* \*